US007542930B1

(12) United States Patent
O'Leary et al.

(10) Patent No.: US 7,542,930 B1
(45) Date of Patent: Jun. 2, 2009

(54) RULES BASED SCENARIO MANAGEMENT

(75) Inventors: Mark O'Leary, Mountain View, CA (US); Chandra Srivastava, San Jose, CA (US); Sen Zhang, Ann Arbor, MI (US); Natovian Ward, San Jose, CA (US)

(73) Assignee: Open Invention Network, Durham, NC (US)

( * ) Notice: Subject to any disclaimer, the term of this patent is extended or adjusted under 35 U.S.C. 154(b) by 1047 days.

(21) Appl. No.: 10/105,015

(22) Filed: Mar. 22, 2002

(51) Int. Cl.
*G06Q 40/00* (2006.01)
(52) U.S. Cl. .......................................... 705/35; 705/38
(58) Field of Classification Search ............. 705/35–45; 707/202, 3
See application file for complete search history.

(56) References Cited

U.S. PATENT DOCUMENTS 6,088,686 A * 7/2000 Walker et al. ................. 705/38
6,098,051 A * 8/2000 Lupien et al. ............. 705/36 R
6,484,151 B1 * 11/2002 O'Shaughnessy ......... 705/36 R
6,709,330 B1 * 3/2004 Klein et al. ..................... 463/9
2002/0059135 A1 * 5/2002 Ma et al. ....................... 705/37

OTHER PUBLICATIONS

Gold, LauraMaery and Dan Post, Book "Invest Online, Do it yourself and keep more of what you earn", an eTrade publication, 1997 ISBN: 0028623983.*

* cited by examiner

*Primary Examiner*—Mary Cheung
*Assistant Examiner*—Kirsten S Apple
(74) *Attorney, Agent, or Firm*—Ernest J. Beffel, Jr.; Haynes Beffel & Wolfeld LLP

(57) ABSTRACT

A scenario manager allows users to define document-based choreography and simulate the behavior of a trading partner in a computer system. Rules are utilized to orchestrate the transaction sequence to test the functionalities and performances of the system as a whole and trading partners that participate in a scenario. Each scenario is defined with one or more steps, each of the steps having a condition and/or an action, wherein the condition defines prerequisites for the step to be executed and the action defines what happens if the step is executed. All the steps that have no conditions are executed first, resulting in one or more responses being received from trading partners. Then all steps having conditions that are satisfied in light of any responses received are performed. This is then repeated until no more conditions are satisfied or there are no steps left to perform.

46 Claims, 4 Drawing Sheets

RULES BASED SCENARIO MANAGEMENT

FIELD OF THE INVENTION

The present invention relates to the field of computer science. More particularly, the present invention relates to the management of work-flow scenarios that simulate the behavior of trading partners through a rules based system.

BACKGROUND OF THE INVENTION

Workflow is the automatic routing of documents to users responsible for working on them. It is utilized most commonly for business processes, as a way to provide information required to support each step of the business cycle. The documents may be physically moved over a network or maintained in a single database with the appropriate users given access to the data at certain times. Triggers may be implemented in the system to alert managers when operations are overdue. Automated workflow allows documents to move along at a prescribed pace and ensures that the appropriate people process them in the correct order.

When designing a workflow, it is often advantageous to test out the workflow to ensure it works properly and efficiently. Scenarios can be created to define document-based choreography and simulate the behavior of trading partners. These scenarios may then be applied to the workflow to test its functionality.

Scenarios may be created using a scenario manager. Scenario managers in the past, however, have only been single user solutions. They only have the ability to create documents, send them out, and wait for a response. There is no intelligence available to simulate entire business processes.

What is needed is a solution that allows for simulation of potentially complex business processes in their entirety.

BRIEF DESCRIPTION OF THE INVENTION

A scenario manager allows users to define document-based choreography and simulate the behavior of a trading partner in a computer system. Rules are utilized to orchestrate the transaction sequence to test the functionalities and performances of the system as a whole and trading partners that participate in a scenario. Each scenario is defined with one or more steps, each of the steps having a condition and/or an action, wherein the condition defines prerequisites for the step to be executed and the action defines what happens if the step is executed. All the steps that have no conditions are executed first, resulting in one or more responses being received from trading partners. Then all steps having conditions that are satisfied in light of any responses received are performed. This is then repeated until no more conditions are satisfied or there are no steps left to perform.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
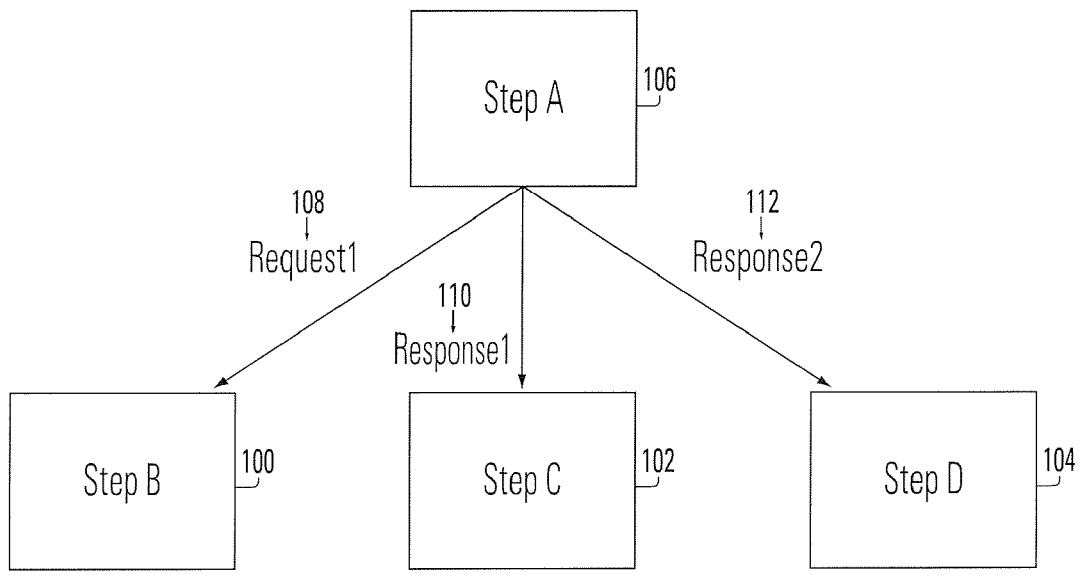
FIG. 1 is a diagram illustrating current branching in accordance with a specific embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In accordance with a specific embodiment of the present invention, a scenario manager is provided to allow users to define document-based choreography and simulate the behavior of a trading partner. Rules are utilized to orchestrate the transaction sequence in order to test the functionalities and performances of the system as a whole and trading partners that participate in the scenario. Scenarios may be defined in an Extensible Markup Language (XML) based scenario configuration language (SCL). One of ordinary skill in the art will recognize, however, that there may be other languages with properties similar to XML which may be utilized, or that an extensible markup language other than XML may be used.

SCL may be derived from the Simple Rule Markup Language (SRML) and may provide the maximum flexibility in defining very complex scenarios. SCL allows for the creation of scenarios having a set of rules defining how a simulated trading partner behaves at different stages of the workflow.

In the scenario manager, a scenario rule, called a step, defines what requests get sent out under what conditions. The conditions may include if a certain request was sent out, received, or validated. When a user starts a scenario, all the steps that have no conditions are executed first, which results in initial requests being sent out to trading partners. When responses from trading partners come back, the conditions of more steps are satisfied. That causes these steps to be executed and more requests are sent out. The cycle continues until the scenario terminates or an error occurs.

A scenario comprises a global transmission property and one or more steps. A global transmission property defines a trading partner identification, transmission protocol, transmission mode, and any other properties significant to the transmission. A step may have a condition part and an action part, both of which are optional. The condition part defines prerequisites for a step to be taken and the action part defines what happens if a step is executed. A step without the condition part is executed at the start of the scenario unconditionally. A step without the action part is a validation step and can be used to terminate an execution branch without ending the entire scenario.

A condition part may comprise a set of conditions. There may be two kinds of conditions: request sent conditions and response received conditions. A request sent condition defines what request document has to be sent out before the current step can be executed. It refers to a request previously sent our by another step. A response received condition defines what response has to be received before the current step can be executed. Optionally, a response received Condition may also include document type validation and content validation. The document type validation indicates what type of document the response has to be and is defined by the document version name and document type name. The content type validation verifies a certain field of the response document against a certain value. The response document field to be validated is defined by the XML Path Language (xPath). xPath is a query language for accessing parts of an XML document. The value that the field is compared against can be a predefined static value, or it can be a dynamic value only known at execution time. In the case of dynamic value, the value is expressed in xPath by a pointer which points into another request or response document that is previously sent or received.

An action part may comprise one or more actions. There are two kinds of actions: send request actions and termination actions. A send request action defines what document is to be retrieved from the document repository and sent to the trading partner. Content modifications may be optionally defined within the send request action to modify the content of request document before it is sent out. The content modification assigns a certain value to a certain field of the request document. The request document field to be modified is defined in xPath. The value that the field may a predefined static value or a dynamic value only known at execution time. In the case of dynamic value, the value is expressed in xPath by a pointer that points into another request or response document that is previously sent or received. Additionally, a local transmission property may optionally be defined to override the default global transmission property. If the local transmission property is missing, the global transmission property is used for the send request action. The local transmission property may be used to send requests to different trading partners, using different transmission protocols (e.g., HTTPS, SONIC Message Queue, etc.) and in different modes (e.g., synchronous vs. asynchronous).

A termination action indicates that the entire scenario should be ended. Optionally, a termination action can be termination with error, using a defined error message.

There are four possible ways a scenario execution may terminate:

1) termination action is executed by a step.
2) All steps are executed, thus no executable steps are left.
3) An execution exception occurs, such as failing to transmit a request document.
4) An error document is received from a Portal Router.

In a specific embodiment of the present invention, SCL may be defined in a Schema Language for Object-Oriented XML (SOX) schema. When a scenario configuration is loaded into a rule engine instance for execution, it is first validated against the SOX schema for grammar correctness.

In a specific embodiment of the present invention, the following SOX schema may be utilized. One of ordinary skill in the art will recognize, however, that other implementations for the SOX schema and the invention in general are possible.

```
<?xml version="1.0" encoding="UTF-8"?>
<!DOCTYPE schema SYSTEM "urn:x-commerceone:document:com:commerceone:xdk:xml:schema.dtd$1.0">
<schema uri="urn:x-commerceone:document:com:commerceone:tdk:qap:scenario:config:scenario.sox$1.0">
    <elementtype name="Scenario">
        <model>
            <sequence>
                <element type="TransmissionProperty"/>
                <element type="TransformationProperty" occurs="0,1"/>
                <element type="Step" occurs="*"/>
            </sequence>
        </model>
        <attdef name="name" datatype="string">
            <required/>
        </attdef>
    </elementtype>
    <elementtype name="TransmissionProperty">
        <model>
            <sequence>
                <element type="ProtocolType" name="Protocol" occurs="0,1"/>
                <element type="string" name="PortalRouterURL" occurs="0,1"/>
                <element type="string" name="UserID" occurs="0,1"/>
                <element type="string" name="Password" occurs="0,1"/>
```

-continued

```
            <element type="string" name="SenderMPID" occurs="0,1"/>
            <element type="string" name="DestinationMPID" occurs="0,1"/>
            <element type="boolean" name="Sign" occurs="0,1"/>
            <element type="boolean" name="Encrypt" occurs="0,1"/>
            <element type="ModeType" name="Mode" occurs="0,1"/>
            <element type="string" name="SonicBasicLocalInputQueue" occurs="0,1"/>
            <element type="string" name="SonicBasicLocalSyncInputQueue" occurs="0,1"/>
            <element type="string" name="SonicBasicDestinationQueue" occurs="0,1"/>
            <element type="string" name="SonicBrokerUid" occurs="0,1"/>
            <element type="string" name="SonicBrokerPassword" occurs="0,1"/>
        </sequence>
    </model>
</elementtype>
<elementtype name="TransformationProperty">
    <model>
        <sequence>
            <element type="string" name="InternalVersion" occurs="0,1"/>
            <element type="string" name="ExternalVersion" occurs="0,1"/>
            <element type="boolean" name="TransformResponseToRequestVersion" occurs="0,1"/>
        </sequence>
    </model>
</elementtype>
<elementtype name="Step">
    <model>
        <sequence>
            <element type="ConditionPart" occurs="0,1"/>
            <element type="ActionPart"/>
        </sequence>
    </model>
    <attdef name="name" datatype="string">
        <required/>
    </attdef>
</elementtype>
<elementtype name="ConditionPart">
    <model>
        <sequence>
            <element type="RequestSent" occurs="*"/>
            <element type="ResponseReceived" occurs="*"/>
        </sequence>
    </model>
</elementtype>
<elementtype name="RequestSent">
    <model>
        <element type="string" name="MessageName"/>
    </model>
</elementtype>
<elementtype name="ResponseReceived">
    <model>
        <element type="BinaryExpression" occurs="*"/>
    </model>
    <attdef name="docType" datatype="string">
        <implied/>
    </attdef>
    <attdef name="version" datatype="string">
        <implied/>
    </attdef>
    <attdef name="messageName" datatype="string">
        <required/>
    </attdef>
    <attdef name="requestMessageName" datatype="string">
        <required/>
    </attdef>
</elementtype>
<elementtype name="BinaryExpression">
    <model>
        <sequence>
            <element type="Left"/>
            <element type="Right"/>
        </sequence>
    </model>
    <attdef name="operator" datatype="OperatorType">
        <required/>
    </attdef>
</elementtype>
<elementtype name="Left">
    <model>
        <string/>
    </model>
    <attdef name="messageName" datatype="string">
```

-continued

```
            <required/>
         </attdef>
      </elementtype>
      <elementtype name="Right">
         <model>
            <string/>
         </model>
         <attdef name="messageName" datatype="string">
            <implied/>
         </attdef>
      </elementtype>
      <elementtype name="ActionPart">
         <model>
            <sequence>
               <element type="SendRequest" occurs="*"/>
               <element type="Terminate" occurs="0,1"/>
            </sequence>
         </model>
      </elementtype>
      <elementtype name="Terminate">
         <model>
            <element type="string" name="Message" occurs="0,1"/>
         </model>
         <attdef name="isError" datatype="boolean">
            <default>false</default>
         </attdef>
      </elementtype>
      <elementtype name="SendRequest">
         <model>
            <sequence>
               <element type="TransmissionProperty" occurs="0,1"/>
               <element type="TransformationProperty" occurs="0,1"/>
               <element type="Modify" occurs="*"/>
            </sequence>
         </model>
         <attdef name="docType" datatype="string">
            <required/>
         </attdef>
         <attdef name="version" datatype="string">
            <required/>
         </attdef>
         <attdef name="application" datatype="string">
            <required/>
         </attdef>
         <attdef name="documentName" datatype="string">
            <required/>
         </attdef>
         <attdef name="messageName" datatype="string">
            <required/>
         </attdef>
      </elementtype>
      <elementtype name="Modify">
         <model>
            <sequence>
               <element type="Left"/>
               <element type="Right"/>
            </sequence>
         </model>
      </elementtype>
      <datatype name="ProtocolType">
         <enumeration datatype="NMTOKEN">
            <option>HTTP</option>
            <option>SONICMQ</option>
         </enumeration>
      </datatype>
      <datatype name="ModeType">
         <enumeration datatype="NMTOKEN">
            <option>SYNC</option>
            <option>ASYNC</option>
            <option>ONEWAY</option>
         </enumeration>
      </datatype>
      <datatype name="OperatorType">
         <enumeration datatype="NMTOKEN">
            <option>LT</option>
            <optinn>GT</option>
```

```
    <option>NE</option>
    <option>EQ</option>
  </enumeration>
</datatype>
</schema>
```

Step conditions are essentially validations on documents sent out or received. A step is only executed if all the validations are true. Users can realize complex document based workflow by manipulating step conditions. The following are examples of some common workflow controls that may be realized using SCL.

Current Branching

FIG. 1 is a diagram illustrating current branching in accordance with a specific embodiment of the present invention. Current branching is realized by basing multiple steps' conditions on requests or responses to requests sent out at one step. Thus, step B 100, C 102, and D 104 branch out from step A 106. Step A 106 sends out Request1 108 and Request2 110. When Request1 108 is sent out, the condition for Step B 100 is satisfied and step B 100 is executed. When the response to Request1 108 is received, the condition for step C 102 is executed. When the response to Request2 110 is received, the condition for step D 104 is satisfied and step D 104 is executed.

Conditional Branching

Figure 2:
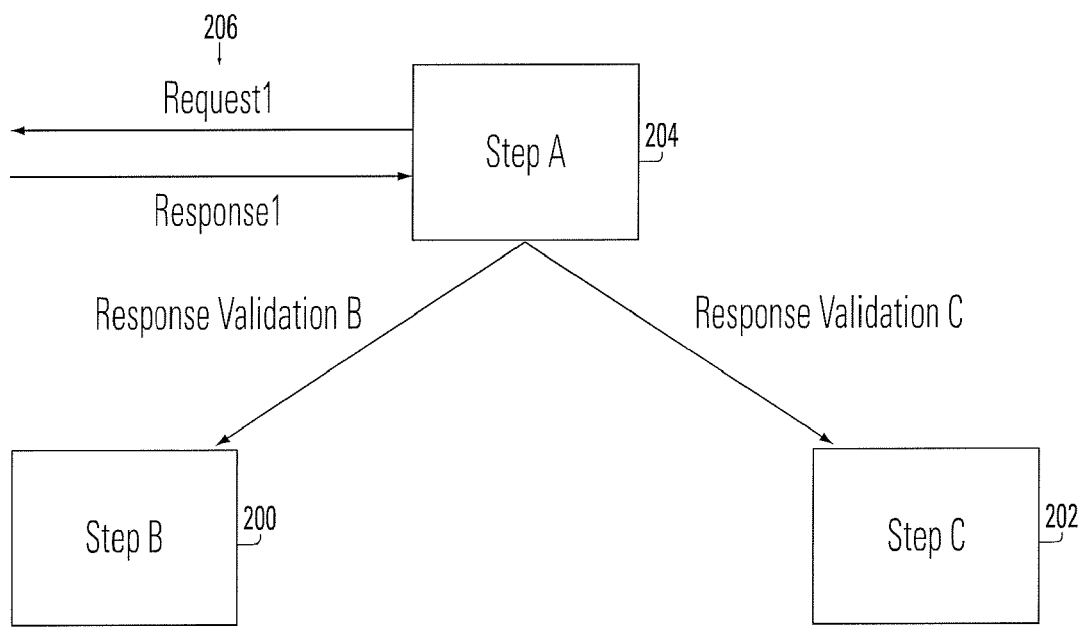
FIG. 2 is a diagram illustrating conditional branching in accordance with a specific embodiment of the present invention.

FIG. 2 is a diagram illustrating conditional branching in accordance with a specific embodiment of the present invention. Conditional branching is realized by basing multiple steps' conditions on responses to one request sent out at one step. Thus, step B 200 and C 202 branch out from step A 204 conditionally. Step A 204 sends out a Request1 206. When the response to Request1 206 is received, it has either document type1 or document type2. When the response has document type1, the condition for step B 200 is satisfied so step B 200 is executed. When the response has document type2, the condition for step C 202 is satisfied so step C 202 is executed.

Branch Merging

Figure 3:
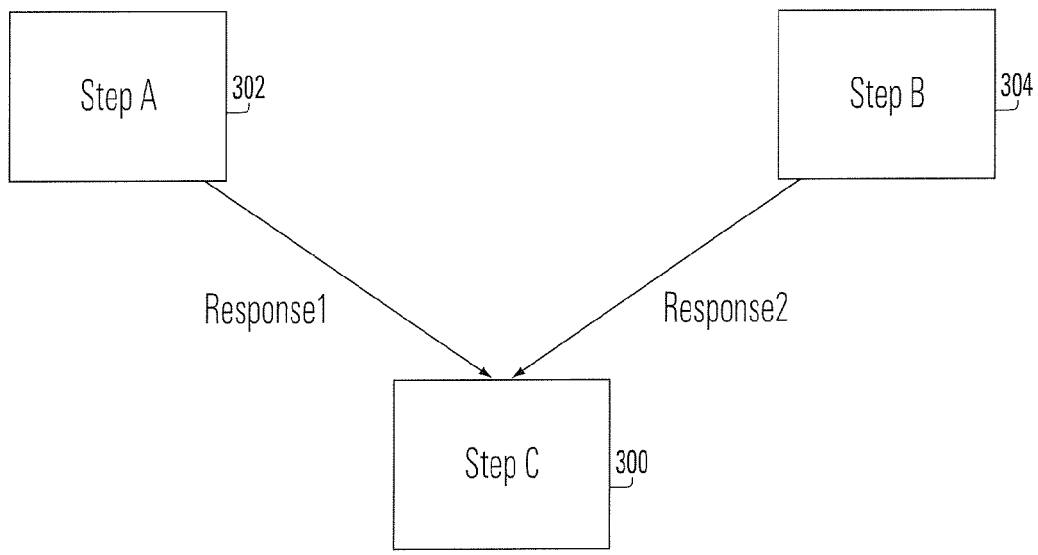
FIG. 3 is a diagram illustrating branch merging in accordance with a specific embodiment of the present invention. Branch merging is realized by basing a step's condition on responses to requests sent out at different steps in different branches.

FIG. 3 is a diagram illustrating branch merging in accordance with a specific embodiment of the present invention. Branch merging is realized by basing a step's condition on responses to requests sent out at different steps in different branches. Thus, step C 300 merges the two branches from step A 302 and B 304 by waiting on both response request1 sent at step A 302 and response to request2 sent at step B 304.

In a specific embodiment of the present invention, the scenario manager may be composed of four layers: a web interface layer, a functional layer, a service later, and a data layer. The web interface layer may be realized by a set of Java Server Pages™ (JSP) pages that interact either with the user through a web browser or with other applications via http posting. The functional layer may carry most of the scenario manager's business logic, but may not be involved in displaying, logging, sending/retrieving data, and other common low level services. The service layer may provide these common low level service. The data layer may archive both static XML documents and dynamically generated data at runtime in the format of both disk files and database records.

Each layer may be further divided into functional modules. A module may only rely on modules in the same or lower layers for services through predefined application program interfaces (APIs), so that code changes in lower layers can be insulated and development work can be carried out in parallel.

Figure 4:
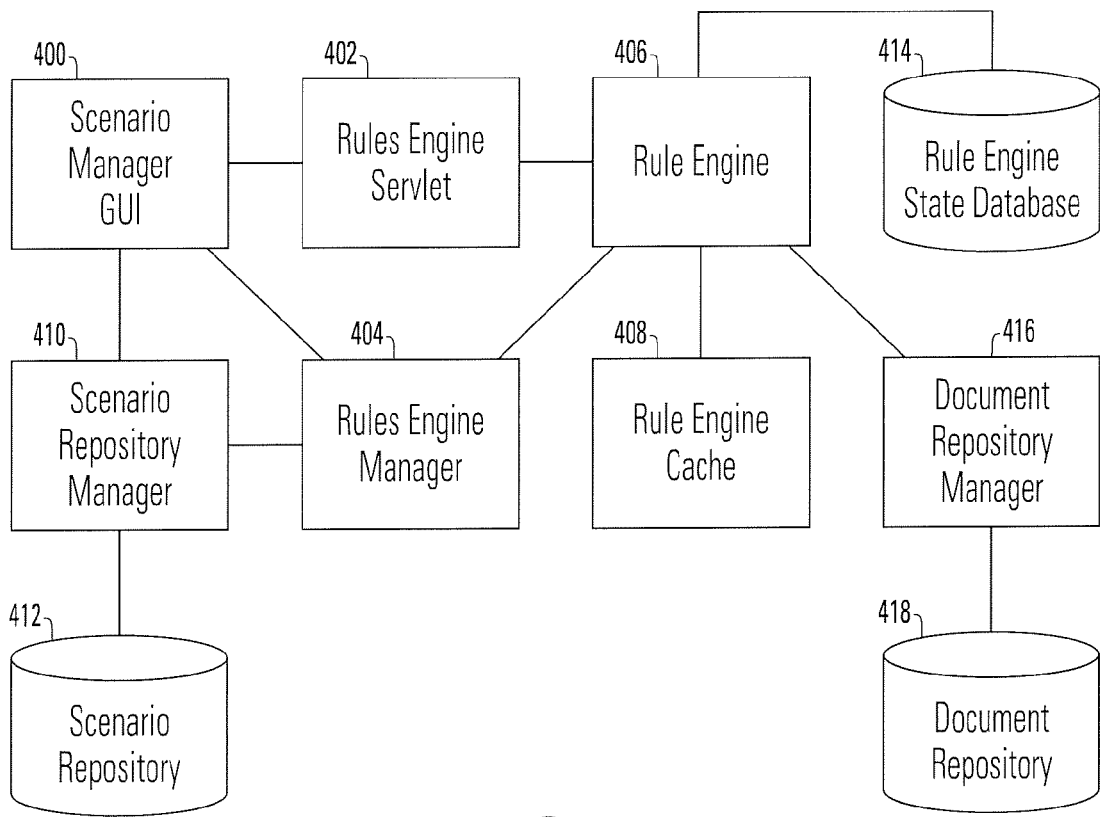
FIG. 4 is a block diagram illustrating an apparatus for simulating behavior of a trading partner in a computer system, the behavior represented as a scenario, in accordance with a specific embodiment of the present invention.

FIG. 4 is a block diagram illustrating an apparatus for simulating behavior of a trading partner in a computer system, the behavior represented as a scenario, in accordance with a specific embodiment of the present invention.

A scenario manager graphical user interface (GUI) 400 may be utilized to provide a web interface for defining new scenarios, modifying existing scenarios, and executing scenarios. It uses a scenario repository manager 410 for saving, retrieving, and modifying scenario configuration documents in the scenario repository database. It also uses a rules engine manager 404 for executing scenarios.

A rules engine servlet 402 may be utilized to provide a programmatic http interface for the scenario manager. When an asynchronous response document arrives at the asynchronous receiver, the receiver will log the document to a logs database via a logger. Then the receiver posts to the rules engine servlet informing it of the arrival of the new response document with the message's correlation Id. When the rule engine servlet receives such a post, it then calls to the rule engine manager 404 to resume a certain scenario's execution.

A rules engine manager 404 may be utilized to provide the starting and resuming of a scenario's execution. When the rule engine manager 404 is called by the scenario manager GUI 400 to start a new scenario, the manager creates a new rule engine, gets a unique session Id and assigns it to the new engine, loads the engine with the scenario configuration, initiates the engine state and then starts the scenario's execution. After the new engine starts, the rule engine manager 404 may save it into the rule engine cache 408.

When the rule engine servlet calls 402 the rule engine manager 404 to resume a scenario's execution with a response message's correlation Id, the manager looks up the session Id using the correlation Id. Since each rule engine instance is uniquely identified by the session Id, the rule engine manager 404 can find the engine instance with the session Id and then inform it of the response message's message Id to resume the engine instance's execution.

A rule engine 406 may be utilized to understand SCL and execute scenarios according to a scenario's configuration rules. During a scenario's execution, the rule engine calls the document repository manager 416 to load and document that it is going to send from a document repository database 418. It calls the sender to send the request document to trading partners and uses the logger to log any information, warnings, or errors into the logs database. The rule engine 406 may also be a state engine that maintains step information, such as which step has been executed, what messages were sent, and what messages were received in between executions. The rule engine is also serializable so that it can be persisted into the rule engine state database by the rule engine cache 408.

The rule engine cache 408 may be designed for performance, scalability, and reliability. The cache may be implemented as an in-memory has map (first level cache) with a database backup (second level cache). When a new rule engine instance is put into the rule engine cache's in-memory cache, it is also serialized into the rule engine state database.

When a rule engine's state is update, the update happens both on the in-memory cache and on the rule engine state database.

The in-memory rule engine cache has a predefined maximum size (configurable by the qap_rule_engine_cache_size parameter in the qap_config.prop file). If a new rule engine instance is put into the cache and the cache exceeds its maximum size, a first-in-first-out (FIFO) rule is applied to remove the oldest engine instance from the in-memory cache. Since the secondary cache (rule engine state database) also records the engine state, no information is lost.

When the rule engine manager 404 calls the rule engine cache 408 to find a rule engine instance with a unique session Id for the purpose of resuming a scenario's execution or generating scenario reports, the rule engine cache first tries to look up the instance from the in-memory has map. If the engine instance is found in the memory, it is immediately returned to the caller, otherwise the instance is reloaded from the rule engine state database into the in-memory has map. Since FIFO is used for cache maintenance, the most frequently used engine instance tends to stay in the memory, thus a high performance is achieved.

The maximum size of the in-memory cache is adjustable and the size of the on-database secondary cache is virtually unlimited. If an e-tools portal is heavily used, resulting in a large number of scenario executions going on simultaneously, the portal may be installed on a server with a large memory size and the qap_rule_engine_cache_size parameter may be set to a larger number, so more engine instances can stay in the memory and good performance can be maintained. Thus, the solution is scalable.

Since the engine state is update on both the in-memory cache and the rule engine state database, if a system crash occurs, no state information is lost. After the system is recovered, the engine instances can be reloaded into the memory from the database and resume their executions. This results in a very reliable solution.

A scenario repository manager 410 provides a set of APIs to interface with the scenario repository database. It may be used by the scenario manager GUI 400 to maintain scenario configurations. It may also be used by the rule engine manager to load scenario configurations into the rule engine instance for execution.

The scenario repository 412 itself may be implemented as a database table (ScenarioRepositoryTable) on a Structure Query Language (SQL) database. Each scenario is unique identified by the scenario name, and the content of scenario configuration is saved as a text data type. Other modules may then access the scenario repository database 412 via the scenario repository manager.

The rule engine state database 414 may be implemented as a database table (ScenarioEngineStateTable) on a SQL database. Each engine state may be uniquely identified by the session Id. The content of the engine state may be the serialized rule engine instance.

Figure 5:
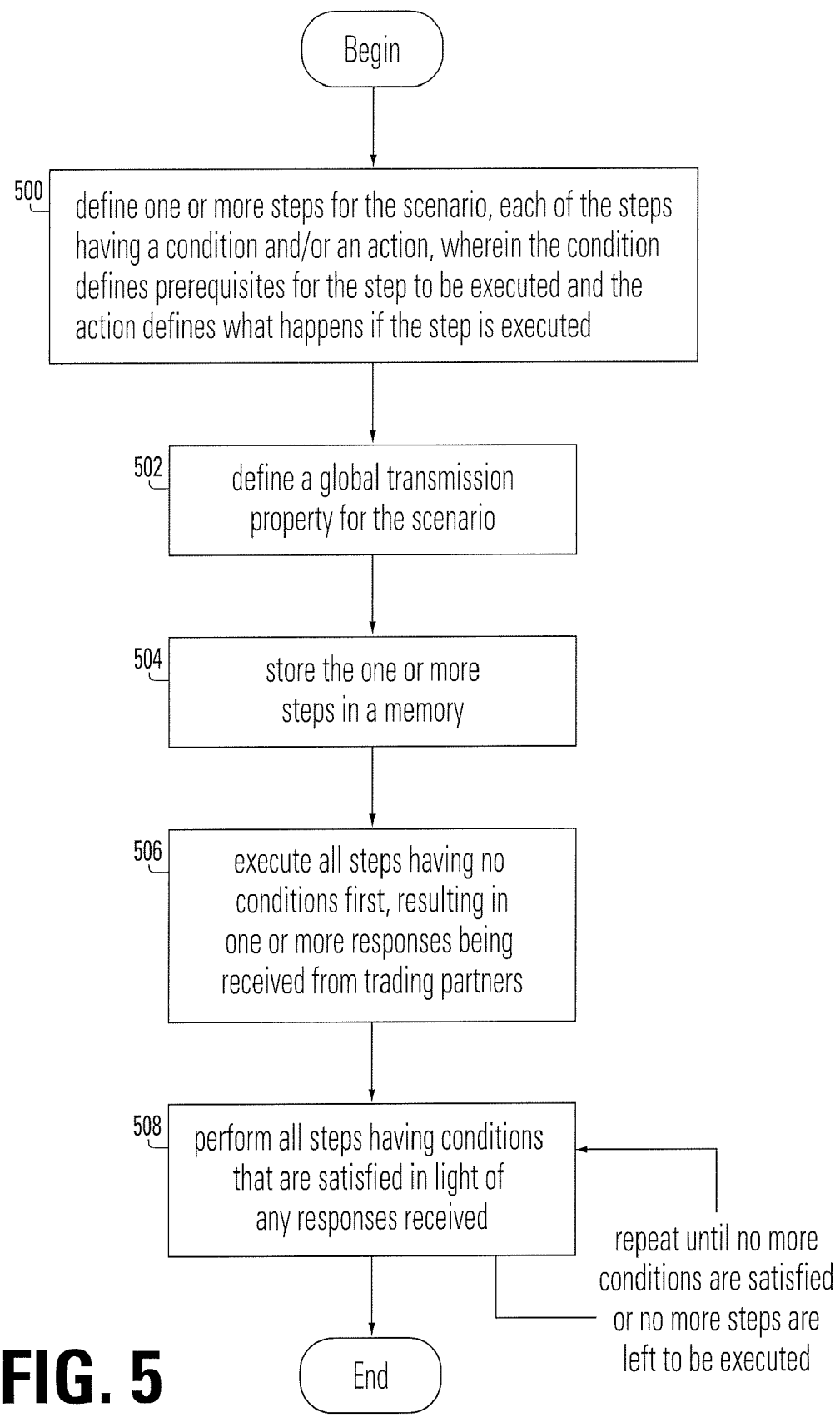
FIG. 5 is a flow diagram illustrating a method for simulating behavior of a trading partner in a computer system, the behavior represented as a scenario, in accordance with a specific embodiment of the present invention.

FIG. 5 is a flow diagram illustrating a method for simulating behavior of a trading partner in a computer system, the behavior represented as a scenario, in accordance with a specific embodiment of the present invention. At 500, one or more steps are defined for the scenario, each of the steps having a condition and/or an action, wherein the condition defines prerequisites for the step to be executed and the action defines what happens if the step is executed. Any step lacking an action is a validation step which may be used to check for proper operation. Each of the conditions may be a request sent condition or a response received condition. A request sent condition defines what request document has to be sent before the step may be executed. A response received condition defines what response has to be received before the step may be executed. The response received condition may include a document type validation and/or a content validation. The document type validation indicates what type of document the response has to be. This may be defined by a document version name and a document type name. The content validation may verify a certain field of a response document against a static or dynamic value. Each of the actions may be a send request action or a termination action. A send request action defines what document is to be retrieved from a document repository and sent to the trading partner. Content modifications may be defined with in the send request action to modify the content of a request document before it is sent out. A local transmission property may also be defined within the send request action for overriding a global transmission property. A termination action may indicate that the entire scenario should be ended.

At 502, a global transmission property may be defined for the scenario. The global transmission property may include any properties significant to the transmission of data between trading partners. This may include a trading partner identification, a transmission protocol, a transmission mode, and/or a transmission mode. At 504, the one or more steps are stored in a memory. At 506, all steps having no conditions are executed first, resulting in one or more responses being received from trading partners. At 508, all steps having conditions that are satisfied in light of any responses received are performed. 508 is repeated until no more conditions are satisfied or no more steps are left to be executed.

Figure 6:
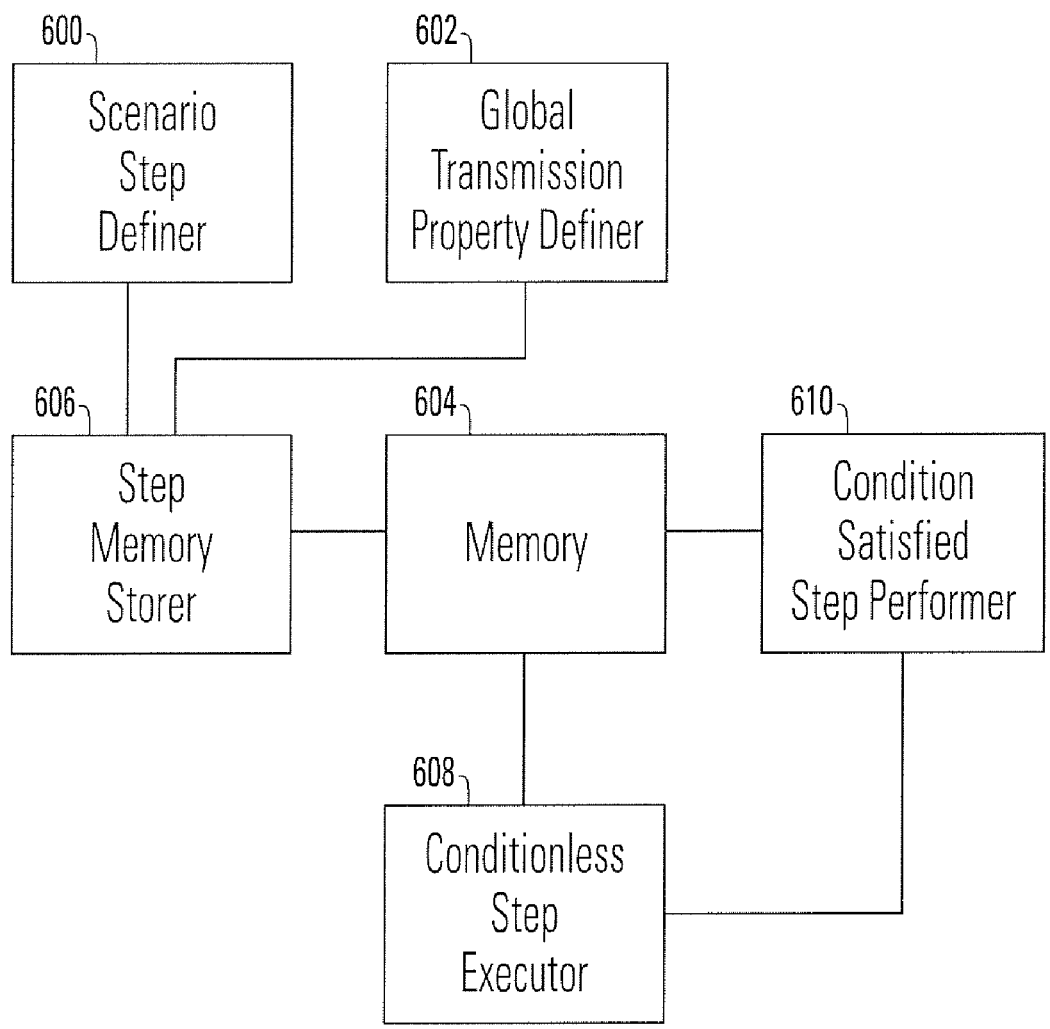
FIG. 6 is a block diagram illustrating a method for simulating behavior of a trading partner in a computer system, the behavior represented as a scenario, in accordance with a specific embodiment of the present invention.

FIG. 6 is a block diagram illustrating a method for simulating behavior of a trading partner in a computer system, the behavior represented as a scenario, in accordance with a specific embodiment of the present invention. A scenario step definer 600 defines one or more steps for the scenario, each of the steps having a condition and/or an action, wherein the condition defines prerequisites for the step to be executed and the action defines what happens if the step is executed. Any step lacking an action is a validation step which may be used to check for proper operation. Each of the conditions may be a request sent condition or a response received condition. A request sent condition defines what request document has to be sent before the step may be executed. A response received condition defines what response has to be received before the step may be executed. The response received condition may include a document type validation and/or a content validation. The document type validation indicates what type of document the response has to be. This may be defined by a document version name and a document type name. The content validation may verify a certain field of a response document against a static or dynamic value. Each of the actions may be a send request action or a termination action. A send request action defines what document is to be retrieved from a document repository and sent to the trading partner. Content modifications may be defined with in the send request action to modify the content of a request document before it is sent out. A local transmission property may also be defined within the send request action for overriding a global transmission property. A termination action may indicate that the entire scenario should be ended.

A global transmission property definer 602 defines a global transmission property for the scenario. The global transmission property may include any properties significant to the transmission of data between trading partners. This may include a trading partner identification, a transmission protocol, a transmission mode, and/or a transmission mode. A memory 604 may be provided. A step memory storer 606 coupled to the scenario step definer 600, the global transmission property definer 602, and the memory 604 may store the one or more steps are stored in the memory 604. A conditionless step executor 608 coupled to the memory 604 may executed all steps having no conditions are executed first, resulting in one or more responses being received from trading partners. A condition satisfied step performer 610 coupled to the memory 604 and to the conditionless step executor 608 performs all steps having conditions that are satisfied in light of any responses received are performed. This is repeated until no more conditions are satisfied or no more steps are left to be executed.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method of simulating a complex document-based choreography of message exchanges between services, the method including:
   representing as one or more scenarios a business process that includes exchanges of electronic documents between computer nodes, including,
      defining a plurality of scenario steps, wherein the steps have a condition and/or an action, wherein the condition defines prerequisites for the step to be executed and the action defines what happens if the step is executed; and
      storing the plurality of steps in a memory; and
   testing at least one scenario on a computer coupled to the memory, including,
      executing steps having no conditions are executed first, resulting in one or more simulated messages being received from at least one of the computer nodes, the simulated messages including one or more electronic documents;
      performing steps having conditions that are satisfied in light of the simulated messages received; and
      repeating the performing of steps having conditions that are satisfied until no more conditions are satisfied or no more steps are left.

2. The method of claim 1, further including defining a global transmission property for each scenario.

3. The method of claim 2, wherein the global transmission property includes any properties significant to the transmission of data between trading partners.

4. The method of claim 2, wherein the global transmission property includes a trading partner identification.

5. The method of claim 2, wherein the global transmission property includes a transmission protocol.

6. The method of claim 2, wherein the global transmission property includes a transmission mode.

7. The method of claim 1, wherein a step lacking an action is a validation step which may be used to check for proper operation.

8. The method of claim 1, wherein each of said conditions is a request sent condition or a response received condition.

9. The method of claim 8, wherein said request sent condition defines what request document has to be sent before said step may be executed.

10. The method of claim 8, wherein said response received condition defines what response has to be received before said step may be executed.

11. The method of claim 8, wherein said response received condition may include a document type validation and/or a content validation.

12. The method of claim 11, wherein said document type validation indicates what type of document said response has to be.

13. The method of claim 12, wherein said document type validation is defined by a document version name and a document type name.

14. The method of claim 11, wherein said content validation verifies a certain field of a response document against a value.

15. The method of claim 14, wherein the value may be static or dynamic.

16. The method of claim 1, wherein each of said actions is a send request action or a termination action.

17. The method of claim 16, wherein said send request action defines what document is to be retrieved from a document repository and sent to the trading partner.

18. The method of claim 17, wherein content modifications are defined within said send request action to modify the content of a request document before it is sent out.

19. The method of claim 17, wherein a local transmission property is defined within said send request action for overriding a global transmission property.

20. The method of claim 16, wherein a termination action indicates that the entire scenario should be ended.

21. The method of claim 20, wherein if a termination action is executed during said executing or performing, the method ends.

22. A computer-implemented apparatus that simulates complex document-based choreography of message exchanges between services, the apparatus including:
   a business process scenario definer;
   a scenario step definer;
   a global transmission property definer;
   a memory;
   a step memory storer coupled to said scenario step definer, said global transmission property definer, and said memory;
   a conditionless step executor coupled to said memory;
   a condition satisfied step performed executor coupled to said memory and to said conditionless step executor.

23. An apparatus for simulating behavior of a trading partner in a computer system, the behavior represented as a scenario, the apparatus comprising:
   a rule engine servlet stored in computer memory;
   a rule engine manager stored in computer memory;
   a rule engine running on the computer system coupled to said rule engine manager and to said rule engine servlet;
   a rule engine cache stored in computer memory coupled to said rule engine;
   a scenario repository manager stored in computer memory coupled to said rule engine manager;
   a scenario repository database stored in computer memory coupled to the scenario repository manager; and
   a rule engine state database coupled to the rule engine.

24. The apparatus of claim 23, further including a scenario manager graphical user interface coupled to said rule engine servlet, said rule engine manager, and said scenario repository manager.

25. A computer-implemented apparatus that simulates complex document-based choreography of message exchanges between services, the apparatus including:
   means for representing as one or more scenarios a business process that includes exchanges of electronic documents between computer nodes, including means for defining a plurality of scenario steps, wherein the steps have a condition and/or an action, wherein the condition defines prerequisites for the step to be executed and the action defines what happens if the step is executed; and means for storing the plurality of steps in a memory; and means for testing at least one scenario on a computer coupled to the memory, including means for executing steps having no conditions are executed first, resulting in one or more simulated responses being received from trading partners;

means for performing steps having conditions that are satisfied in light of any simulated responses received; and means for repeating the performing of steps having conditions that are satisfied until no more conditions are satisfied or no more steps are left.

26. The apparatus of claim 25, further including means for defining a global transmission property for the scenario.

27. The apparatus of claim 26, wherein the global transmission property includes any properties significant to the transmission of data between trading partners.

28. The apparatus of claim 26, wherein the global transmission property includes a trading partner identification.

29. The apparatus of claim 26, wherein the global transmission property includes a transmission protocol.

30. The apparatus of claim 26, wherein the global transmission property includes a transmission mode.

31. The apparatus of claim 25, wherein a step lacking an action is a validation step which may be used to check for proper operation.

32. The apparatus of claim 25, wherein each of said conditions is a request sent condition or a response received condition.

33. The apparatus of claim 32, wherein said request sent condition defines what request document has to be sent before said step may be executed.

34. The apparatus of claim 32, wherein said response received condition defines what response has to be received before said step may be executed.

35. The apparatus of claim 32, wherein said response received condition may include a document type validation and/or a content validation.

36. The apparatus of claim 35, wherein said document type validation indicates what type of document said response has to be.

37. The apparatus of claim 36, wherein said document type validation is defined by a document version name and a document type name.

38. The apparatus of claim 35, wherein said content validation verifies a certain field of a response document against a value.

39. The apparatus of claim 38, wherein the value may be static or dynamic.

40. The apparatus of claim 25, wherein each of said actions is a send request action or a termination action.

41. The apparatus of claim 40, wherein said send request action defines what document is to be retrieved from a document repository and sent to the trading partner.

42. The apparatus of claim 41, wherein content modifications are defined within said send request action to modify the content of a request document before it is sent out.

43. The apparatus of claim 41, wherein a local transmission property is defined within said send request action for overriding a global transmission property.

44. The apparatus of claim 40, wherein a termination action indicates that the entire scenario should be ended.

45. The apparatus of claim 44, wherein if a termination action is executed during said executing or performing, the method ends.

46. A program storage device readable by a machine, tangibly embodying a program of instructions executable by the machine to perform a general purpose method for testing business processes, the method comprising the steps of:

representing multiple business processes as scenarios, including;

defining one or more steps for each scenario, each of the steps having a condition and/or an action, wherein the condition defines prerequisites for the step to be executed and the action defines what happens if the step is executed; and storing said one or more steps in a memory; and testing at least one scenario, including executing said all steps having no conditions are executed first, resulting in one or more simulated responses being received from trading partners;

performing all steps having conditions that are satisfied in light of any simulated responses received; and repeating said performing until no more conditions are satisfied or no more steps are left.

* * * * *